United States Patent [19]

Takano et al.

[11] 4,157,551

[45] Jun. 5, 1979

[54] DISTORTION REDUCTION IN INK JET SYSTEM PRINTER

[75] Inventors: Rikuo Takano, Musashino; Yutaka Ohota, Matsuyama; Yoichi Yamamoto; Yuji Sumitomo, both of Nara; Toshio Kobayashi, Osaka; Masahiko Aiba, Nara, all of Japan

[73] Assignees: Nippon Telegraph and Telephone Public Corporation, Tokyo; Sharp Kabushiki Kaisha, Osaka, both of Japan

[21] Appl. No.: 795,619

[22] Filed: May 10, 1977

Related U.S. Application Data

[63] Continuation-in-part of Ser. No. 627,377, Oct. 30, 1975, Pat. No. 4,032,924.

[30] Foreign Application Priority Data

Oct. 31, 1974 [JP] Japan ................................ 49/126144

[51] Int. Cl.2 ............................................ G01D 15/18

[52] U.S. Cl. ..................................................... 346/75

[58] Field of Search ........................................... 346/75

[56] References Cited

U.S. PATENT DOCUMENTS

| | | | |
|---|---|---|---|
| 3,631,511 | 12/1971 | Keur et al. | 346/75 |
| 3,789,422 | 1/1974 | Haskell et al. | 346/75 |
| 3,833,910 | 9/1974 | Chen | 346/75 X |

*Primary Examiner*—George H. Miller, Jr.

*Attorney, Agent, or Firm*—Birch, Stewart, Kolasch and Birch

[57] ABSTRACT

In an ink jet system printer of the charge amplitude controlling type, when it is desired to charge a specific ink drop being formed, the amplitude of charge for the specific ink drops is increased in accordance with the total field strength of the electric fields due to the charge amplitude of the preceding ink drops, the charge of the thus increased amplitude being supplied to the specific ink drop to thereby alleviate any charge distortion.

3 Claims, 12 Drawing Figures

| No | ROM Output | NO | ROM Output |
|---|---|---|---|
| 1 | 1 | 26 | 0 |
| 2 | 1 | 27 | 0 |
| 3 | 1 | 28 | 1 |
| 4 | 1 | 29 | 1 |
| 5 | 1 | 30 | 0 |
| 6 | 1 | 31 | 0 |
| 7 | 1 | 32 | 0 |
| 8 | 1 | 33 | 0 |
| 9 | 0 | 34 | 0 |
| 10 | 0 | 35 | 1 |
| 11 | 1 | | |
| 12 | 0 | | |
| 13 | 0 | | |
| 14 | 1 | | |
| 15 | 1 | | |
| 16 | 0 | | |
| 17 | 0 | | |
| 18 | 1 | | |
| 19 | 0 | | |
| 20 | 0 | | |
| 21 | 1 | | |
| 22 | 1 | | |
| 23 | 0 | | |
| 24 | 0 | | |
| 25 | 1 | | |

DISTORTION REDUCTION IN INK JET SYSTEM PRINTER

BACKGROUND OF THE INVENTION

This application is a continuation-in-part of application Ser. No. 627,377 filed Oct. 30, 1975 entitled DISTORTION REDUCTION IN INK JET SYSTEM PRINTER, now Pat. No. 4,032,924 issued June 28, 1977.

The present invention relates to an ink jet system printer provided with means for compensating for any charge distortion in ink drops.

It is well known in the art of ink jet system printers that high speed printing performances require increases in the frequency of ink drop formation. Furthermore, it is required to increase ink pressure but such requirement is not fully satisfied in view of size and weight of the printers. An alternate approach to increase the ink drop formation frequency is to decrease ink drop spacing. In accordance with such approach, the charging of a specific ink drop is influenced by an electric field established due to the preceding ink drops to thereby cause charge distortion and, therefore, the specific ink drop being currently charged can erroneously assume an amplitude of charge smaller than a desired one. This causes faulty printing. In the past, several approaches were suggested in order to reduce such charge distortion, as disclosed U.S. Pat. No. 3,631,511 entitled "DROP CHARGE COMPENSATED INK DROP VIDEO PRINTER" on Dec. 28, 1971 wherein the charge on an ink drop being formed is compensated upon the charge on the drop already formed, and U.S. Pat. No. 3,562,757 entitled "GUARD DROP TECHNIQUE FOR INK JET SYSTEMS" on Feb. 9, 1971 wherein guard drops are provided between the charged drops which act as a shield to minimize the adverse effects of drop charge repulsion.

However, the inventor's experiments show that in the former arrangement distortion of around 10% develops when $\lambda/d \simeq 4.8$ wherein d is the diameter of a charging electrode and $\lambda$ is the ink drop spacing, while in the latter arrangement printing speed is decreased by one-half, accompanying distortion of around 8%.

It is therefore, an object of the present invention to provide an improved ink jet system printer having a charge compensator.

BRIEF DESCRIPTION OF THE DRAWINGS

Other objects and many of the attendant advantages of the present invention will be readily appreciated as the same becomes better understood by reference to the following detailed description considered in conjunction with the accompanying drawings in which like reference numerals designate like parts throughout the figures thereof, and wherein.

DESCRIPTION OF THE PREFERRED EMBODIMENTS

Figure 1:
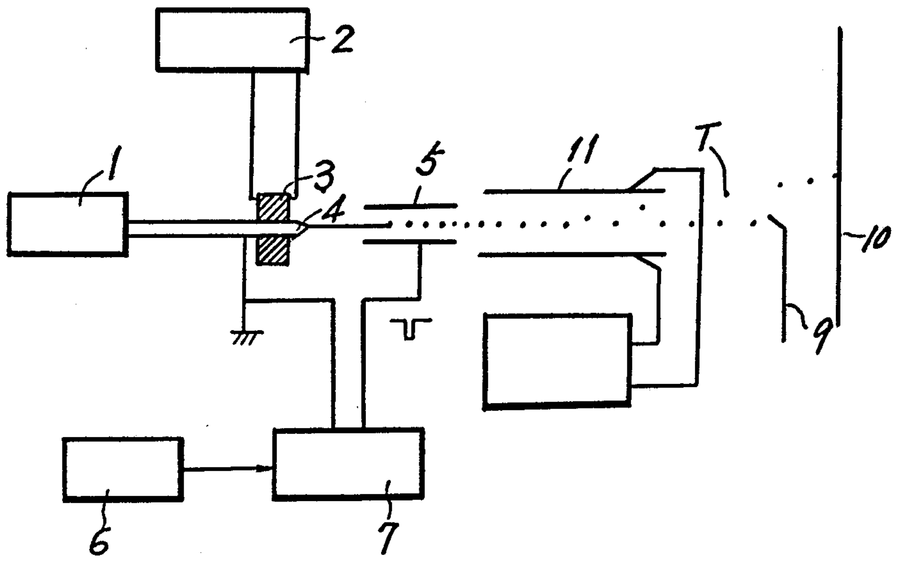
FIG. 1 is a schematic illustration of an ink jet system printer of the charge amplitude controlling type.

Referring now to FIG. 1 there is illustrated a general construction of conventional ink jet system printers including an ink jet system printer embodying the present invention, wherein a string of ink drops T to be deposited on a record receiving medium 10 is formed by the ejection of ink from an ink supply source 1 through a nozzle 4 activated by a vibrator 3 responsive to signals from an ultrasonic signal source 2. The thus formed ink drops have fine quality. In particular, the best results are obtained under the ink pressure of 2.2 $Kg/cm^2$, the nozzle diameter of around 65 $\mu m$ and the ultrasonic frequency of 35 $KH_z$.

Figure 2:
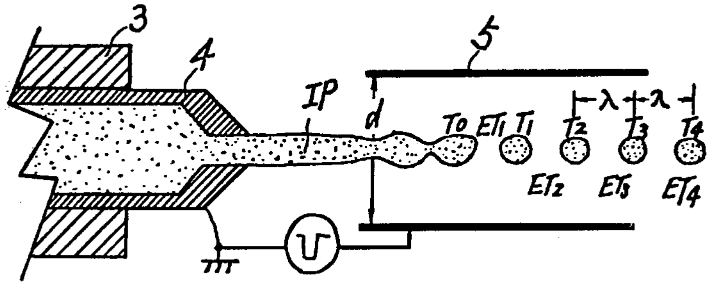
FIG. 2 is a detailed illustration of an ink drop charging state in the printer of FIG. 1.

As will be clear from FIG. 2, the ink liquid ejected through the nozzle 4 is broken up into ink drops within the interior of a charging electrode 5 and subsequently the respective ink drops are charged in accordance with video signals from a video signal generator 7 responsive to signals from an information source. As the ink drops pass through deflection electrodes 11, they are deflected in accordance with the amplitude of their charges to form a desired printing pattern on the medium 10. Undesired ink drops are reverted to the ink supply 1 via a gutter 9.

The important aspect of the present invention resides in the following point. The inventor's attention is directed toward the fact that the specific ink drop $T_o$ being currently charged is influenced under electric fields $E_{T1}$, $E_{T2}$... due to the charges $q_{T1}$, $q_{T2}$,... on the preceding ink drops $T_1$, $T_2$..., which accompanies intensity reduction in the electric field $E_v$ established by video signal supplied to the charging electrode 5 for the specific ink drop $T_o$. This implies that the specific ink drop $T_o$ is charged under the electric field $E = E_v - E_{T1} - E_{T2} - \ldots = E_v - E_n$. The present invention is to alleviate the error term $E_n = E_{T1} + E_{T2} + \ldots$. Affix of negative sign to $E_{T1}$, $E_{T2}$, ... in the above equation is due to the fact that the electric field due to the charging electrode is opposite to the counterpart due to the ink drops.

Figure 3:
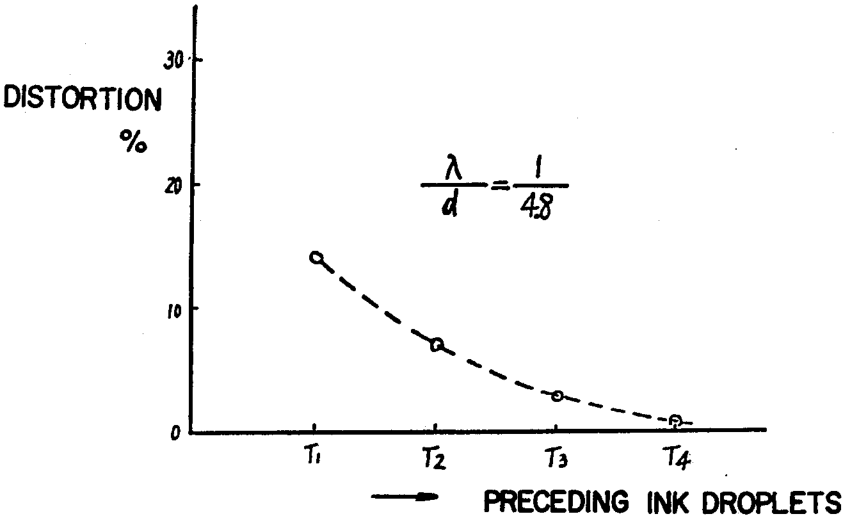
FIG. 3 is a graph showing the relationship between distortion and preceding ink drops.

By way of example, when $\lambda/d \doteqdot 0.2$ wherein $\lambda$ is the ink drop spacing and d is the diameter of the charging electrode 5 the adverse effects on the specific ink drop $T_o$ being formed will be given below, as also suggested in FIG. 3.

| | |
|---|---|
| Distortion due to the charge amplitude $q_{T1}$ of the ink drop $T_1$ | 14% |
| Distortion due to the charge amplitude of $q_{T2}$ of the ink drop $T_2$ | 7% |
| Distortion due to the charge amplitude $q_{T3}$ of the ink | |

-continued

| | |
|---|---|
| drop $T_3$ | 3% |
| Distortion due to the charge amplitude $q_l$ of the ink drop $T_4$ | 0.5% |

Figure 4:
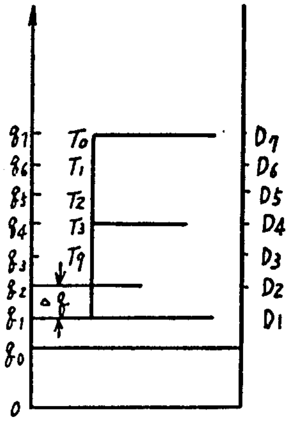
FIG. 4 is a graph showing the relationship between the amplitude of charge and character pattern.

It should be noted that the distortion is evaluated under assumption that the continuous ink drops have the same charge amplitude (for example, the charge amplitude $q_7$ of the ink drop $D_7$ on the seventh row as shown in FIG. 4) for simplicity of explanation, though at no time do the respective ink drops assume the same charge amplitude during one-column printing. The ink drop $T_1$ corresponds to the same on the sixth row and shows distortion $e=14\ q_4/q_7\%$ wherein its charge is designated $8_4$. Meanwhile, when the ink drop $T_3$ corresponds to the same on the sixth row and assumes the charge amplitude $q_6$, distortion is represented by $e=q_6/q_7\%$.

FIG. 4 illustrates the charge amplitude necessary to print a typical character "E". It is obvious that a specific ink drop $D_n$ assumes the charge amplitude as defined below where the charge amplitude of the ink drops $D_1$, $D_2$, ... on the first line, the second line, ... is designated $q_1$, $q_2$, ...

$$q_n=q_o+n\Delta q \quad (1)$$

where $q_o$ is the charge on the gutter level, $\Delta q$ is the charge difference among the adjacent ink drops and n is an integer 1, 2, 3, ...7.

Printing distortion occurring during practical operation will be evaluated by reference to FIG. 4 in the case that the ink drop on the first column, the seventh row is desired to be charged.

The ink drop $T_o$—the first column, the seventh row
The ink drop $T_1$—the first column, the sixth row
The ink drop $T_2$—the first column, the fifth row
The ink drop $T_3$—the first column, the fourth row
The ink drop $T_4$—the first column, the third row As suggested in FIG. 3, these ink drops will afford the adverse effects on the specific ink drop $T_o$ as follows:

| | |
|---|---|
| The effect due to the ink drop $T_1$ | $14\frac{q_6}{q_7}\%$ |
| The effect due to the ink drop $T_2$ | $7\frac{q_5}{q_7}\%$ |
| The effect due to the ink drop $T_3$ | $3\frac{q_4}{q_7}\%$ |
| The effect due to the ink drop $T_4$ | $0.5\frac{q_3}{q_7}\%$ |

A total of distortion subject to the specific ink drop $T_o$ can be expressed as follows:

$$e=0.14q_6/q_7+0.07q_5/q_7+0.03q_7/q_4+0.005q_3/q_7$$

This equation can be rewritten when $q_o=\Delta q$.

$$e=0.147_{qo}/8_{qo}+0.076_{qo}/8_{qo}+0.035_{qo}/8_{qo}+0.0054_{qo}/8_{qo}\simeq 0.20$$

Therefore, the specific ink drop $T_o$ assumes the following charge amplitude when supplied with charging voltage taking account of no influence due to the charges of the preceding ink drops and in other words when supplied with voltage $V_7$ proportional to the charge $q_7$ on the seventh row.

$$q_7 \chi (1-e) \simeq 0.8q_7$$

Therefore, it shows distortion of 20%.

It will be understood from the foregoing formulas that increase in the gutter level provides increase in $q_6/q_7$, $q_5/q_7$, . . . and thus increase in distortion.

The results of the inventor's experiments show the existence of the charge amplitude $\Delta q_{T_n}$ due to an electric field $\Delta ET_n$ determined by the charge amplitude $q_{T_n}$ of the preceding ink drops and the geometric relationship between the charging electrode and the ink liquid stream. This is proportional to distortion, and voltage $\Delta V_{T_n}$ to the charging electrode effective to cancel the term $\Delta q_{T_n}$ can be expressed below:

$$\Delta V_{T_n}=\beta_{T_n}\cdot q_{T_n}$$

wherein $\beta_{T_n}$ is the electrode factor.

The above discussed distortion can be overcome by the following operation effected upon the charge amplitude $q_{T_n}$ and the electrode factor $\beta_{T_n}$ as operands.

$$V=V_o+\beta_{T1}\cdot q_{T1}+\beta_{T2}\cdot q_{T2}+\beta_{T3}\cdot q_{T3}+\beta_{T4}\cdot q_{T4} =\beta_{To}\cdot q_{To}+V_c \quad (2)$$

Voltage effective to supplied the ink drop $T_o$ with the charge $q_o$ when the preceding ink drops have no charge, is $V_o=\beta_{To}\cdot q_{To}\cdot\beta_{Tn}\cdot q_{Tn}$(n=1, 2, 3, ...) represents voltage supplied to the charging electrode to compensate for the adverse effect of $q_{Tn}$. The factor $\beta_{Tn}$ is varied by modification in the electrode assembly and, as a matter of fact, is adjustable in circuit implementations.

Figure 5:
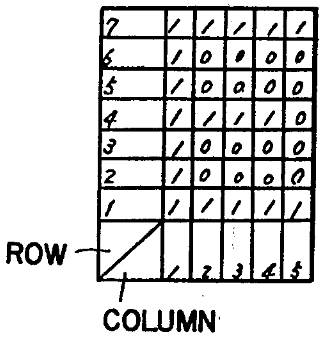
FIG. 5 is a truth table of a character "E"
Figure 6:
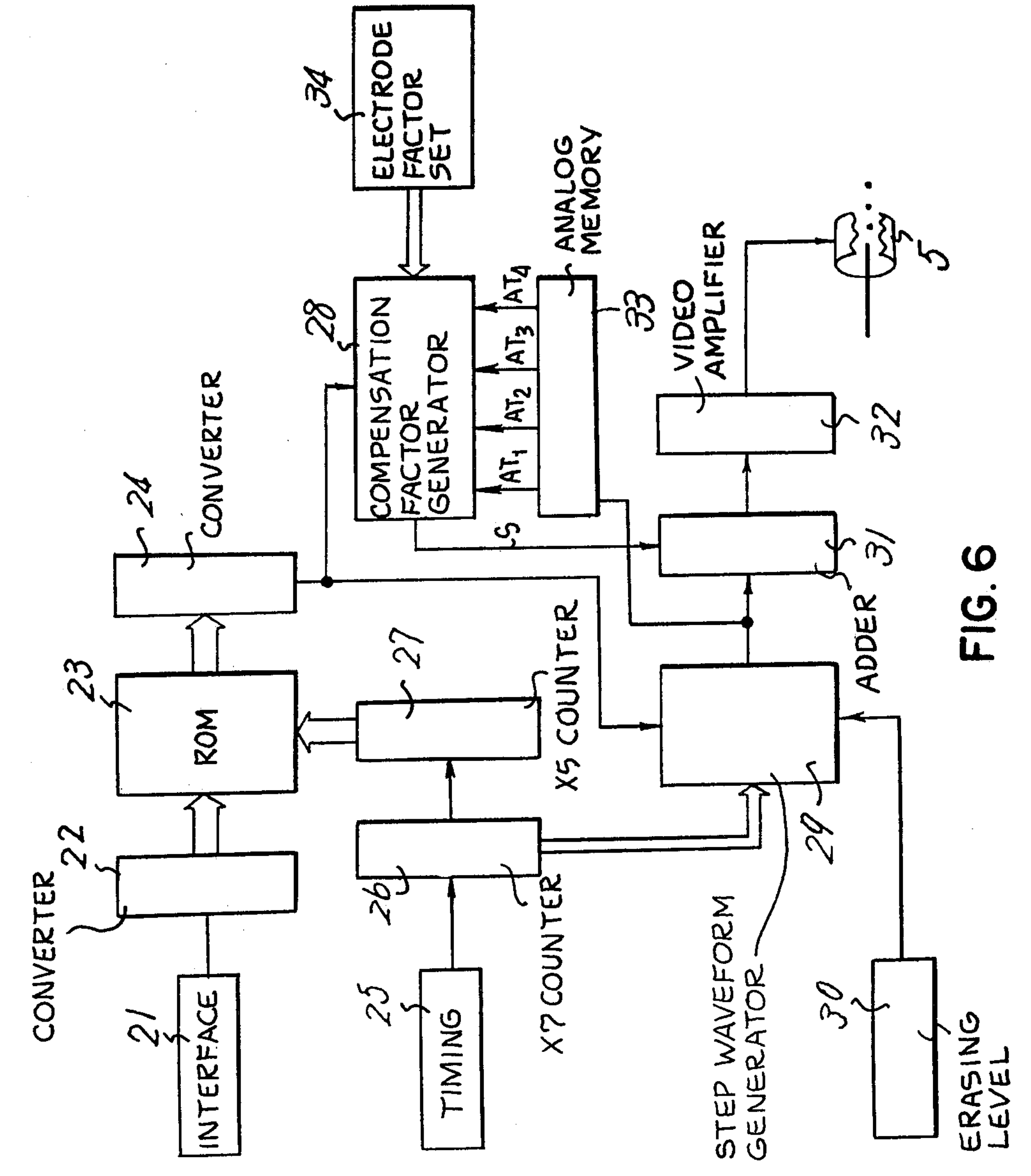
FIG. 6 is a schematic illustration of an ink jet system printer embodying the present invention.
Figure 7:
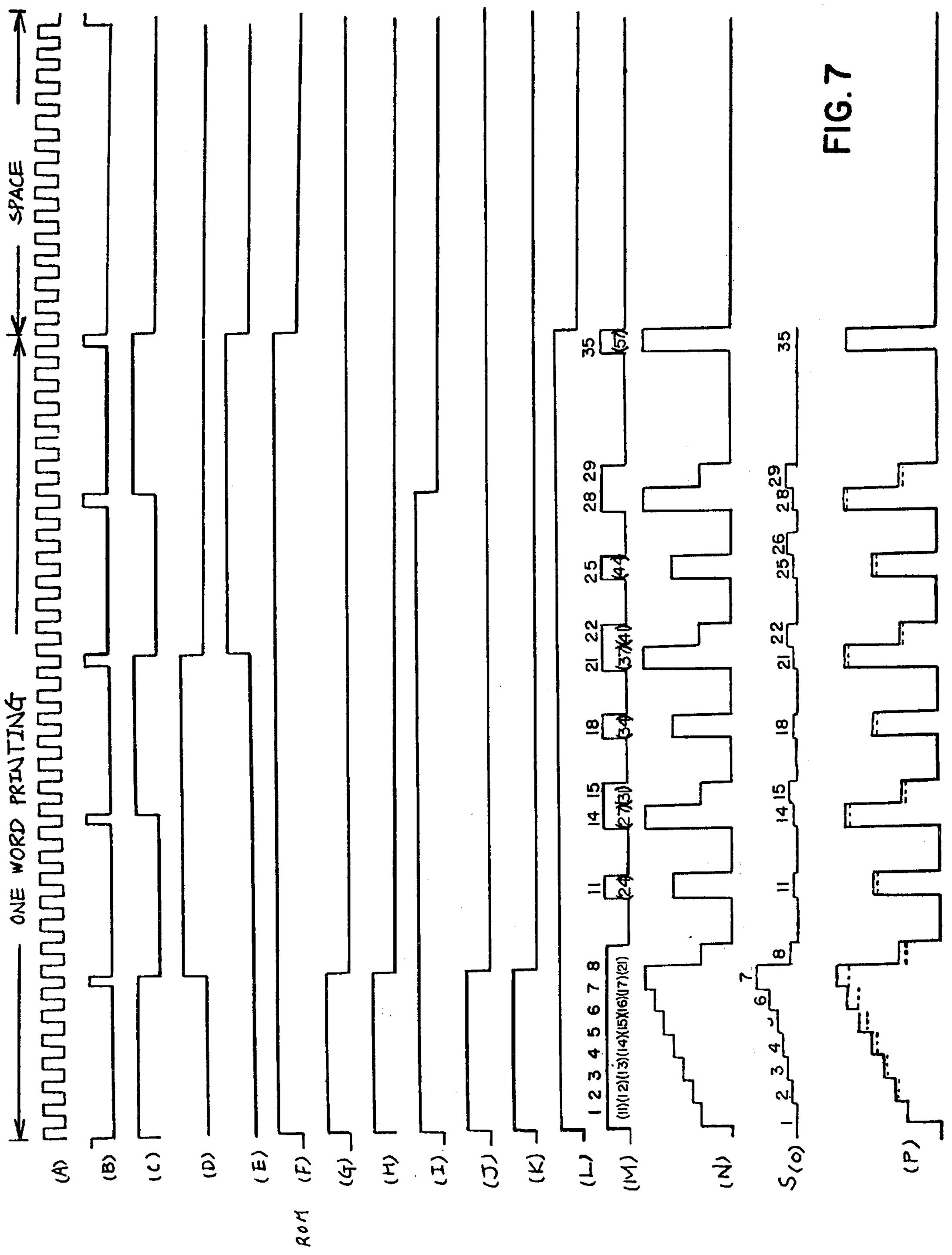
FIG. 7 is a waveform diagram of various signals occurring in the ink jet system printer of FIG. 6.
Figures 8, 9:
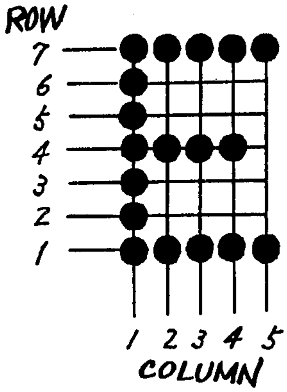
FIG. 8 is a ROM output table for a 5×7 matrix in the ink jet system printer of FIG. 6.
FIG. 9 is a pattern normally written out by the ink jet system printer.

FiG. 6 illustrates means for compensating for the charge amplitude in accordance with teachings of the present invention. In this drawing, 21 represents an input/output interface. Digital information entered through the interface enables a read only memory (ROM) 23 via a seven-bit serial-parallel converter 22. The outputs of ROM 23 are shown in FIG. 7 F-L. The truth table for ROM 23 is shown in FIG. 5 where the character "E" is selected.

When the desired character is selected, a X5 column counter 27 is set concurrently with the setting of a X7 row counter 26 receiving signals (FIG. 7A) from a timing signal generator 25, and subsequently incremented by the output (FIG. 7B) of the row counter 26 as suggested by FIGS. 7C–7E.

When the first column is selected by the output of the column counter, the results are entered into the converter 24 and then into a compensation factor generator 28 bit by bit in synchronization with the X 7 counter 26 (FIG. 7M). A step waveform generator 29 produces seven-step waveform as shown in FIG. 7N upon receipt of the outputs of the row counter 26 and receives the outputs from an erasing level setting circuit 30. It provides its step waveform output when the output of the converter 24 is "1" (FIG. 7M) and does not provide the same when the output is "0". A compensation signal S (FIG. 70) from the compensation factor generator 28 is added to the thus obtained step waveform output. The result is shown in FIG. 7P and supplied via a video amplifier 32 to the charging electrode. An analog memory 33 provides the compensation signal S in response to the outputs $A_{T1}$, $A_{T2}$, . . . .

Figure 10:
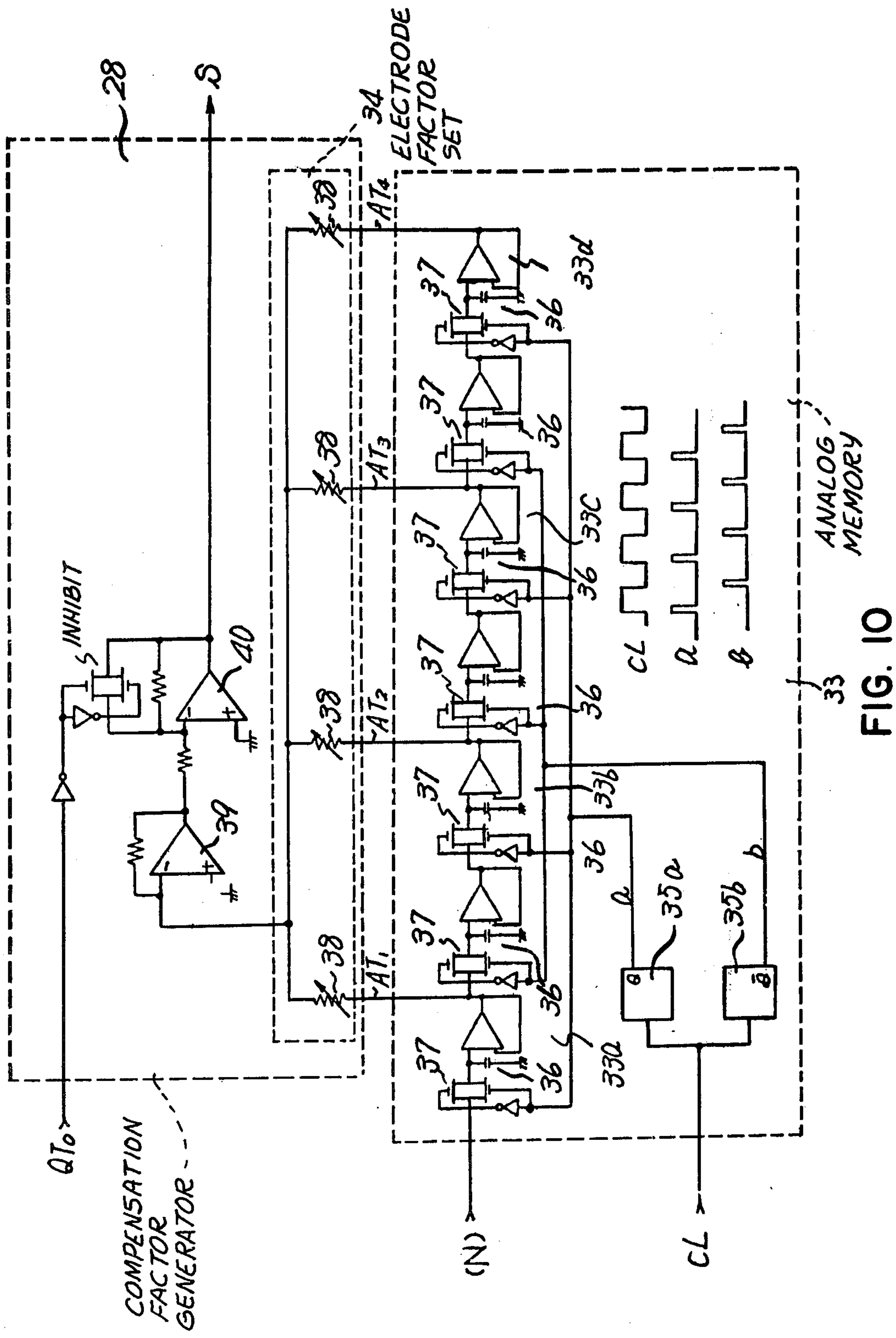
FIG. 10 is a schematic illustration of one preferred form of the present invention including a compensator factor generator, an analog memory and an electrode factor generator.

A circuit arrangement including the compensation factor generator 28, the analog memory 33 and the electrode factor setting circuit 34 is illustrated in FIG. 10, wherein a clock signal CL is supplied to one-shots 35a and 35b to be changed into a pulse having a pulse width sufficient to charge a voltage holding capacitor 36. The thus changed pulse is then applied to an analog switch 37, which also receives the video signal (step waveform) derived from the step waveform generator 29. The output voltage of the analog switch 37 is shifted from the first memory section 33*a* to the fourth memory section 33*d* within the analog memory 33 and the outputs voltages at the respective stages are oriented toward the electrode factor generator 34 as $A_{T1}$, $A_{T2}$, $A_{T3}$ and $A_{T4}$. These output voltages $A_{T1}$, $A_{T2}$, $A_{T3}$ and $A_{T4}$ are adjusted in accordance with $\beta_T/\beta_{T1}$, $\beta_T/\beta_{T2}$, $\beta_T/\beta_{T3}$, $\beta_T/\beta_{T4}$ by means of variable resistors 38 and then supplied to an adder 39. An analog gate circuit 40 is switched between the ON and the OFF states in accordance with the state of the ink drop $T_o$ and more particularly the output of the gate circuit 40 is "0" when the ink drop $T_o$ is "0". Conversely, when the ink drop $T_o$ is "1", the output of the adder 39 is inverted to provide the positive compensation signal.

The compensation factor generator 28 operates in the following manner.

I. When $Q_{T_o}=0$ and in other words the charging of the ink drop $T_o$ is not requested, the generator 28 provides "0".

II. When $Q_{T_o}=1$ and the charging is requested, the following operation is effected:

| ink drop | $T_o$ | $T_1$ | $T_2$ | $T_3$ | $T_4$ |
|---|---|---|---|---|---|
| analog memory output | — | $A_{T1}$ | $A_{T2}$ | $A_{T3}$ | $A_{T4}$ |
| electrode factor | $\beta_{T0}$ | $\beta_{T1}$ | $\beta_{T2}$ | $\beta_{T3}$ | $\beta_{T4}$ |

Therefore, since the outputs of the step waveform generator 29 and the analog memory 33 show voltage $A_{Tn}=\alpha\cdot q_{Tn}\cdot n=0.1\ldots4$, the compensation signal S is proportional to $V_c$ defined in (2) as follows:

$$S=A_{T1}\cdot\beta_{T1}/\beta_{T0}+A_{T2}\cdot\beta_{T2}/\beta_{T0}+A_{T3}\cdot\beta_{T3}/\beta_{T0}+A_{T4}\cdot\beta_{T4}/\beta_{T0}\ldots\ldots$$
$$=\alpha\beta_{T0}(\beta_{T1}\cdot q_{T1}+\beta_{T2}\cdot\beta_{T2}+\beta_{T3}\cdot q_{T3}+\beta_{T4}\cdot q_{T4}) \quad (3)$$

The compensation signal S is provided in this way by the generator 28 and supplied to the input to the adder 31, which performs addition of the compensation signal S and the output of the generator 29 $A_{To}=\alpha.\ q_{To}$.

$$\alpha.\ q_{To}+(\alpha/\beta_{To})(\beta_{T1}\cdot q_{T1}+\beta_{T2}\cdot q_{T2}+\beta_{T3}\cdot q_{T3}+\beta_{T4}\cdot q_{T4})=(\alpha/\beta_{To})(\beta_{To}\cdot q_{To}+\beta_{T1}\cdot q_{T1}+\ldots\ldots)$$

The video amplifier 32 produces the video signal V by multiplication of $\beta_{To}/\alpha$, $$V=\beta_{To}\cdot q_{To}+\beta_{T1}+q_{T1}+\ldots\ldots=V_o+V_c$$

Figure 11:
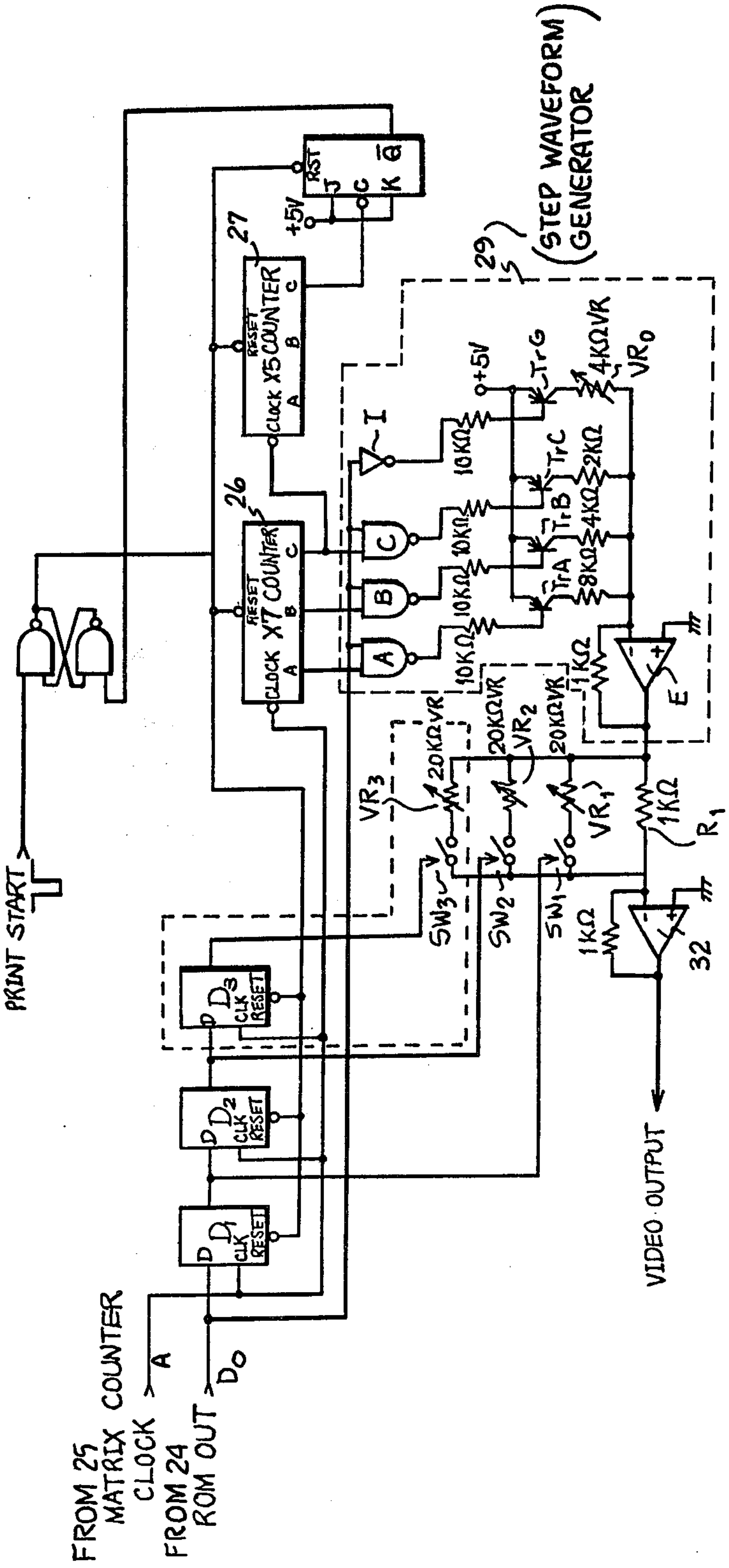
FIG. 11 is a schematic illustration of another preferred form of the present invention.

FIG. 11 shows another system (digital type) for compensation, which can determine the charge amplitude level in response to the charge condition of the preceding three ink droplets. Like elements corresponding to those of FIG. 6 are indicated by like numerals.

It will be clear from FIG. 3 that the specific ink droplet $T_o$ is charged to a level below a desired value by 14% due to the charge amplitude $q_{T1}$ of the ink droplets $T_1$. In order to compensate for the charge distortion caused by the preceding ink droplets $T_1$, the charging signal amplitude should be 100/(100-14) times that of the ordinal one. Generally, when the charge distortion of $\delta$% is created by the preceding ink droplet, the charge amplitude should be amplified to $\xi$ times the ordinal one, where $\xi=100/(100\text{-}\delta)$ As already discussed above, the charge distortion caused by the preceding plurality of ink droplets is the sum of the charge distortion caused by the respective ink droplets. Therefore, the following equation can be formulated.

$$\xi=100/[100-(\delta_1+\delta_2+\ldots\ldots)]$$

where, $\delta_i$: charge distortion caused by the preceding ink droplet $T_i$.

The system of FIG. 11 is constructed on the basis of the above analysis. In this example, the charge distortion caused by the preceding three ink droplets is compensated for. However, in this example, the respective preceding ink droplets are considered to be charged to the same level as the instant ink droplet. Therefore, the compensation is not so strict as compared with the embodiment of FIG. 6, but the circuit construction is simplified as compared with the embodiment of FIG. 6.

The essential part of the system of FIG. 11 comprises three stage cascade delay flip-flops $D_1$, $D_2$ and $D_3$ (significant preceding ink drop state storage), analog switches $SW_1$, $SW_2$ and $SW_3$, and variable resistors $VR_1$, $VR_2$ and $VR_3$.

The operation of the system of FIG. 11 will be described with reference to FIG. 12.

The ROM OUT signal (Do) is applied from the converter 24 (see FIG. 6), in synchronization with the MATRIX COUNTER CLOCK A derived from the timing signal generator 25 (see FIG. 6), to the flip-flop $D_1$ and the step waveform generator 29. The step waveform generator 29 functions to develop a seven step waveform signal in accordance with the output signal of the ×7 counter 26. The step waveform generator 29 does not develop the output signal when the ROM OUT signal (Do) is zero through the use of NAND gates A, B and C, and an inverter I. The output signal of the step waveform generator 29 for printing the character "E" is shown in FIG. 12 (X).

Figure 12:
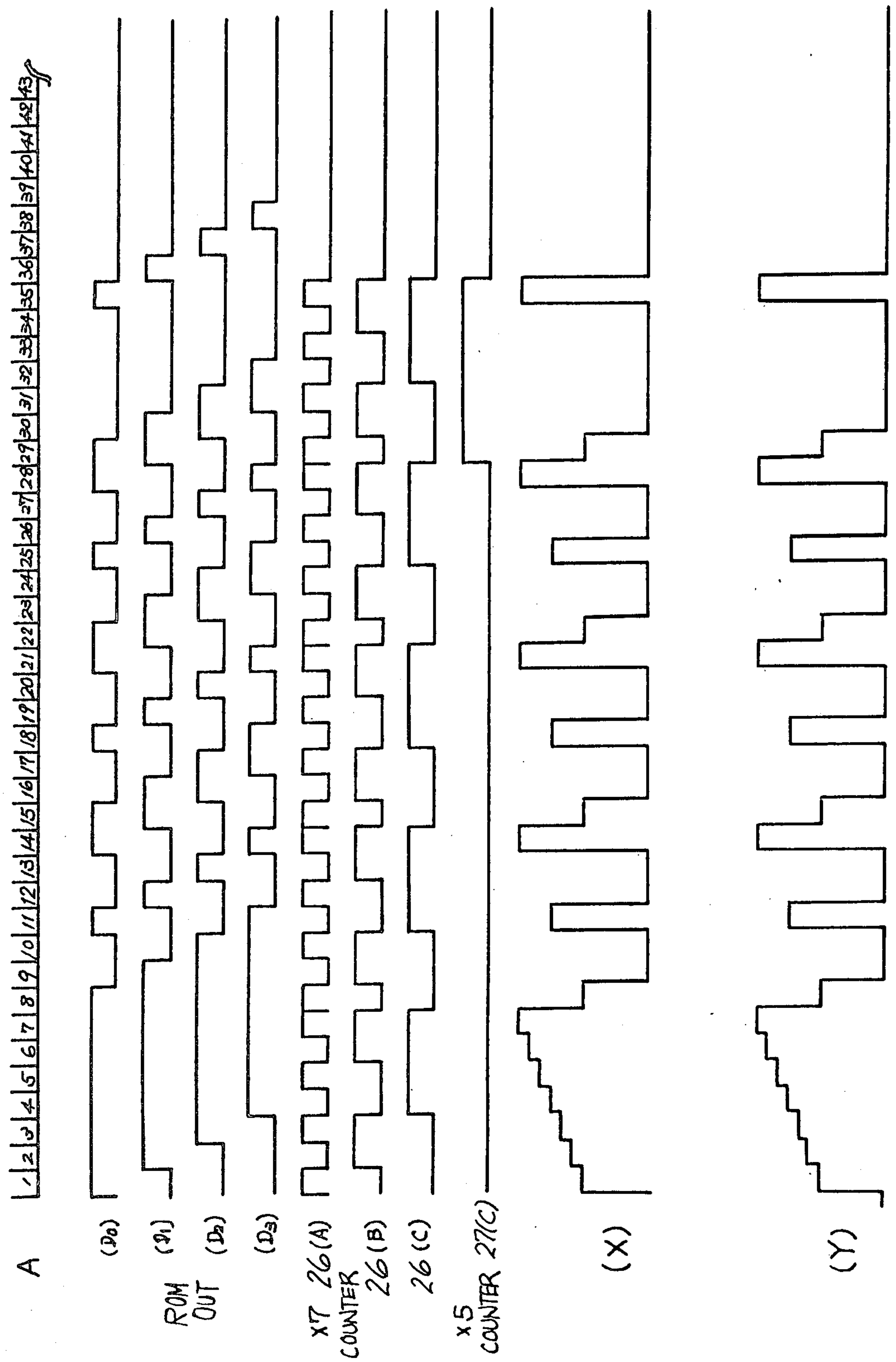
FIG. 12 is a waveform diagram of various signals occurring in the preferred form of FIG. 11.

The outputs of a X7 counter 26 incremented by the trailing edge of the timing generator output are shown in FIG. 12 by 26 (A), 26 (B) and 26 (C). An inverter I responsive to the signal $D_o$ is used for printing purposes. This renders a transistor TrG conductive to permit the flowing of current determined by a variable resistor $VR_o$.

A circuit including the inverter I, transistor TrG and variable resistor $VR_o$ is to determine an erasing level of which the amplitude is ajustable by the variable resistor $VR_o$. NAND gates A, B, C are provided to render, respectively, the transistors TrA, TrB, TrC "ON" to supply respective currents of weights "1", "2" and "4" through an operational amplifier E, the output of which is the uncompensated step waveform (X) as shown in FIG. 12.

When $\overline{D_o.\ A}=0$ the weight is "1"
When $\overline{D_o.\ B}=0$ the weight is "2"
When $\overline{D_o.\ C}=0$ the weight is "4"
When $\overline{D_o}=0$, the erasing level The thus formed step waveform signal (X) of FIG. 12 is compensated for by the compensation means including the flip-flops $D_1$, $D_2$ and $D_3$, the variable resistors $VR_1$, $VR_2$ and $VR_3$, the analog switches $SW_1$, $SW_2$ and $SW_3$, and a resistor $R_1$, whereby a compensated video output (Y) shown in FIG. 12 is developed through the video amplifier 32.

More particularly, when the preceding ink droplets $T_1$ is charged, and the preceding ink droplets $T_2$ and $T_3$ are not charged, the output signal of the flip-flop $D_1$ =1, the output signals of the flip-flops $D_2$ and $D_3$ are "zero", and the ROM OUT Do is "one". Therefore, the analog switch $SW_1$ is closed so as to connect the variable resistor $VR_1$ to the resistor $R_1$ in a parallel fashion. Accordingly, the gain of the video amplifier 32 is increased. The resistance value of the variable resistor $VR_1$ should be selected so as to increase the gain of the video amplifier 32 to $$\xi_1=100/(100-\delta_1)$$

When $D_1$=1, $D_1$=0, $D_2$−1 and $D_3$O, the analog switch $SW_2$ is closed. The resistance value of the variable resistor $VR_2$ should be selected so as to increase the gain of the video amplifier 32 to $$\xi_2=100/(100-\delta_2)$$

In a like manner the variable resistor $VR_3$ should be selected so as to increase the gain of the video amplifier 32 to $$\xi_3=100/(100-\delta_3)$$

Thus, the analog switches SW1, SW2, SW3, the subject resistor R1 and the variable resistors VR1, VR2 and VR3 comprise a gain control network for the amplifier 32 which modifies the uncompensated step waveform (X) from the operating amplifier E into the compensated waveform (Y) appearing at the VIDEO OUTPUT of the video amplifier 32.

While only certain embodiments of the present invention have been described, it will be apparent to those skilled in the art that various changes and modifications may be made therein without departing from the spirit and scope of the invention as claimed.

It is claimed:

1. In an ink jet system printer of the charge amplitude controlling type for recording characters in a dot matrix pattern by a sequence of charged drops, means compensating for the effects of charges on previous ink drops in a sequence on the current charged drops, comprising:

a read only memory (ROM) storing digital character generation output formats;

means controlling said ROM to output a selected character format;

a character generator responsive to said digital character format output from said ROM to produce a step waveform character signal;

dot matrix determining means controlling said character generator to correlate said step waveform character signal to said dot matrix pattern;

storage means receiving said digital character format output from said ROM and retaining a predetermined significant number of preceding outputs from said ROM output for each given current output from said ROM therein; and digital type proportioning means synchronously compensating said waveform for a current step therein as a function of said significant number of preceding ROM outputs by applying to said waveform respectively set compensation values for those charged drops included within said significant number of preceding ROM outputs.

2. The invention defined in claim 1, wherein said proportioning means comprises video amplifier means receiving and amplifying said waveform; and gain control means for said video amplifier means synchronously varying the gain of said video amplifier means as a function of said significant number of preceding ROM outputs.

3. The invention defined in claim 2, wherein said gain control means comprises input resistor means inputting said waveform into said video amplifier means; gain control resistance means equal in number to and respectively corresponding to said significant number of preceding ROM outputs; and means responsive to said significant preceding ROM outputs to selectively interconnect said gain control resistance means in parallel with said input resistance means to thereby vary the gain of said video amplifier.

* * * * *